United States Patent
Marchitto et al.

(10) Patent No.: US 6,573,491 B1
(45) Date of Patent: Jun. 3, 2003

(54) ELECTROMAGNETIC ENERGY DRIVEN SEPARATION METHODS

(75) Inventors: Kevin S. Marchitto, Mt. Eliza (AU); Stephen T. Flock, Mt. Eliza (AU)

(73) Assignee: Rock Mountain Biosystems, Inc., Golden, CO (US)

( * ) Notice: Subject to any disclaimer, the term of this patent is extended or adjusted under 35 U.S.C. 154(b) by 0 days.

(21) Appl. No.: 09/572,763

(22) Filed: May 17, 2000

Related U.S. Application Data (60) Provisional application No. 60/134,487, filed on May 17, 1999, now abandoned.

(51) Int. Cl.[7] .......................... B01D 59/44; H01J 49/40
(52) U.S. Cl. .......................... 250/251; 435/6; 209/12.2; 250/282
(58) Field of Search ............................... 250/251, 282; 210/748; 209/2–4

(56) References Cited

U.S. PATENT DOCUMENTS

| | | | | |
|---|---|---|---|---|
| 3,675,768 A | * | 7/1972 | Legorreta-Sanchez | 209/4 |
| 4,302,305 A | * | 11/1981 | Kaldor et al. | 250/423 P |
| 4,327,288 A | | 4/1982 | Ashkin | 250/251 |
| 4,366,379 A | * | 12/1982 | Cotter | 250/251 |
| 5,069,885 A | * | 12/1991 | Ritchie | 210/748 |
| 5,130,031 A | * | 7/1992 | Johnston | 210/748 |
| 5,182,030 A | * | 1/1993 | Crittenden et al. | 210/748 |
| 5,274,232 A | | 12/1993 | Chu | 250/251 |
| 5,489,506 A | * | 2/1996 | Crane | 435/2 |
| 5,512,745 A | | 4/1996 | Finer | 250/251 |
| 5,637,458 A | * | 6/1997 | Frankel et al. | 435/6 |
| 5,752,606 A | * | 5/1998 | Wilson et al. | 209/2 |
| 5,836,940 A | | 11/1998 | Gregory | 606/15 |
| 5,883,349 A | * | 3/1999 | Kingston | 210/748 |
| 5,999,847 A | | 12/1999 | Elstrom | 604/20 |
| 6,018,678 A | | 1/2000 | Mitraotri | 604/20 |
| 6,056,738 A | | 5/2000 | Marchitto | 606/2 |
| 6,159,749 A | * | 12/2000 | Liu | 250/251 |
| 6,390,302 B1 | * | 5/2002 | Abrarov et al. | 209/12.2 |

FOREIGN PATENT DOCUMENTS

| WO | WO 98/23325 | 6/1998 | ............ A61N/1/30 |
|---|---|---|---|
| WO | WO 00/02590 | 1/2000 | ............ A61K/48/00 |

OTHER PUBLICATIONS

Liburdy, R. *Novel Separation of Protein and Lymphocytes by Liquid Gel Chromatography During Exposure to Radiofrequency Radiation*. Analytical Biochemistry vol. 122, 1982, pp. 148–158.

\* cited by examiner

*Primary Examiner*—Jack Berman
*Assistant Examiner*—Johnnie L Smith, II
(74) *Attorney, Agent, or Firm*—Benjamin Aaron Adler (57) ABSTRACT

The present invention provides electromagnetic energy driven separation methods, including methods for separating molecules in a mixture, for increasing diffusion rate of a substance in a medium, and for moving fluids on a substrate. Such methods work with extremely small volumes of target and may be used for medical diagnosis and treatment.

9 Claims, 6 Drawing Sheets

ELECTROMAGNETIC ENERGY DRIVEN SEPARATION METHODS

CROSS-REFERENCE TO RELATED APPLICATION

This non-provisional patent application claims benefit of provisional patent application U.S. Ser. No. 60/134,487, filed May 17, 1999, now abandoned.

BACKGROUND OF THE INVENTION

1. Field of the Invention

The present invention relates generally to the field of molecule separation. More specifically, the present invention relates to electromagnetic energy driven separation methods.

2. Description of the Related Art

Though a multitude of refinements have been developed to improve the distinctness of the partitioning and increase its rate, better resolution of molecular species continues to be sought. This is particularly true when complex cell or protein populations, such as biological fluids are being separated. In gel filtration terms, the elution time is decreased for these species while the zones are narrowed. In microchip processing terms, fluids are pumped along channels formed in semiconductor substrates in devices such as microchip arrays used for diagnostic testing or for high throughput screening. The channels may be created by conventional means such as chemical etching or lithography.

Although some of the known techniques have been used successfully in separating molecules or moving fluids along channels in semiconductor devices, the development of further and other techniques more efficient and reliable separation would be attainable, and so are techniques for moving a plurality of samples into a microarray of a plurality of wells connected by one or more channels for the purpose of testing or synthesis of samples.

The prior art is deficient in the lack of effective means of separating molecules in tiny and precise volumes by applying electromagnetic energy. Furthermore, the prior art is deficient in the lack of effective means of moving an accurate volume of fluid to appropriate chambers on the microarray by applying the electromagnetic energy. The present invention fulfills this long-standing need and desire in the art.

SUMMARY OF THE INVENTION

The present invention describes methods and devices for delivering electromagnetic energy to move fluids and compounds through various separation media or for the purpose of delivering fluids in small quantities. Specifically, the invention describes methods and devices for separating compounds in various media as a result of imparting electromagnetic energy to create impulse transients, creating direct pressure on molecules based on absorption or reflection characteristics, or by creating optically active derivatives of compounds which migrate in a medium as a result of pressure imparted from a source of electromagnetic energy. Further described are microfluidic devices which utilize electromagnetic energy to create a pressure on fluids thereby allowing for manipulation of extremely small volumes.

In one embodiment of the present invention, there is provided a method for separating molecules in a mixture, comprising the steps of applying the mixture to a support; and irradiating the mixture with electromagnetic energy, wherein the electromagnetic energy creates a pressure wave, a dipole force or an incoherent force in the mixture, which causes the separation. Preferably, the electromagnetic energy is selected from the group consisting of radiofrequency, microwave, and light. Still preferably, the support is a liquid or semi-solid support.

In another embodiment of the present invention, there is provided a method for increasing the diffusion rate of a substance in a medium, comprising the step of applying electromagnetic energy to the medium containing the substance, wherein the electromagnetic energy generates propagating pressure wave, dipole force or incoherent force in the medium, thereby increasing the diffusion rate of the substance. Preferably, the electromagnetic energy is selected from the group consisting of radiofrequency, microwave, and light. A representative medium includes a liquid or semi-solid medium.

In still another embodiment of the present invention, there is provided a method of moving fluids on a substrate, comprising the steps of applying electromagnetic energy to the fluids, wherein the electromagnetic energy generates a propagating pressure wave, dipole force, or incoherent force at the fluid-substrate interface, thereby moving the fluids on the substrate. Preferably, the substrate is a microchip, a microarray plate or a solid support other than a microchip or microarray plate. Still preferably, the electromagnetic energy is selected from the group consisting of radiofrequency, microwave, and light.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
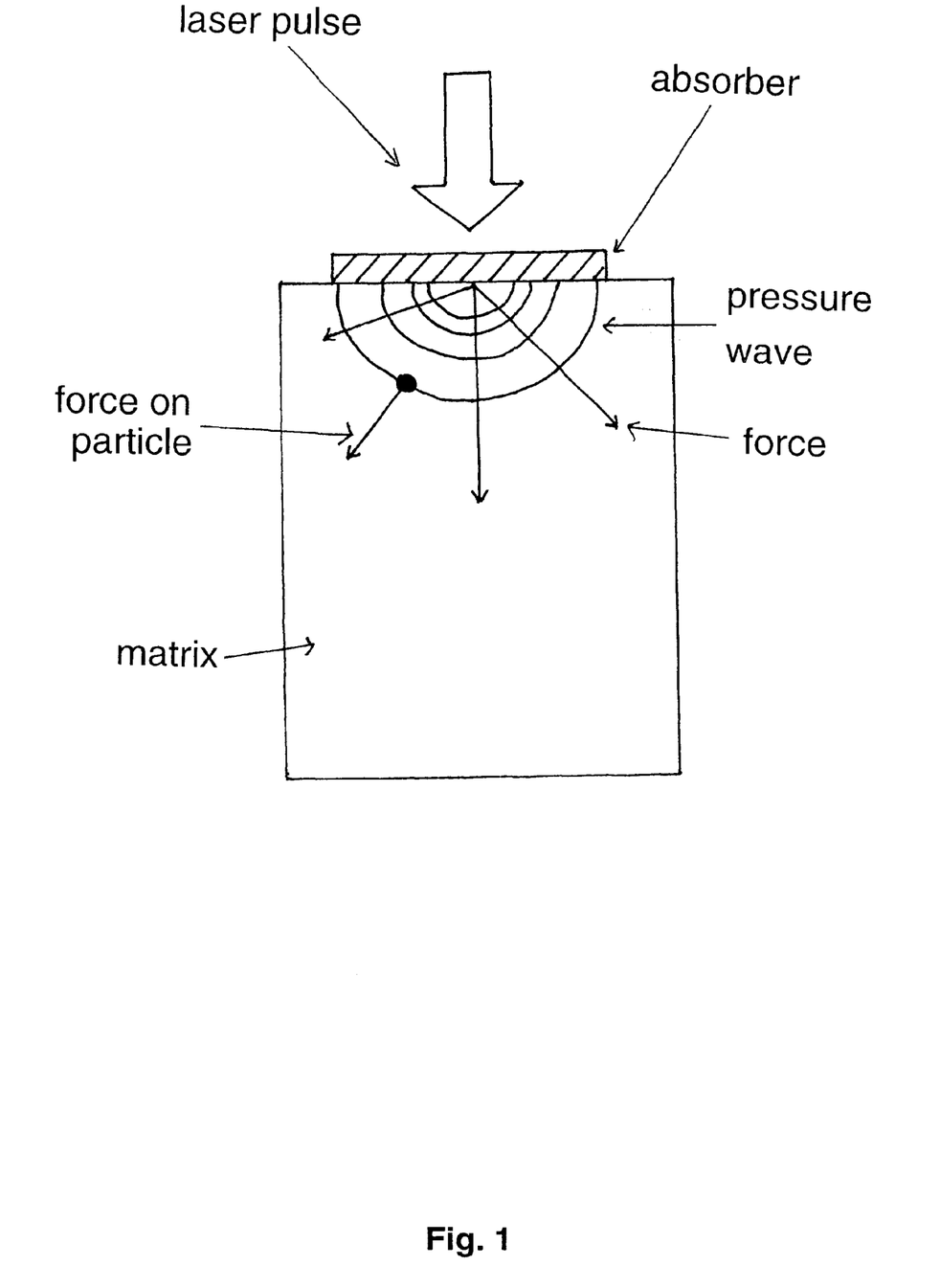
FIG. 1 shows a source of electromagnetic energy (laser pulse) impinging on an absorber, which translates the energy into a pressure wave that exerts force in the indicated directions.
Figure 2:
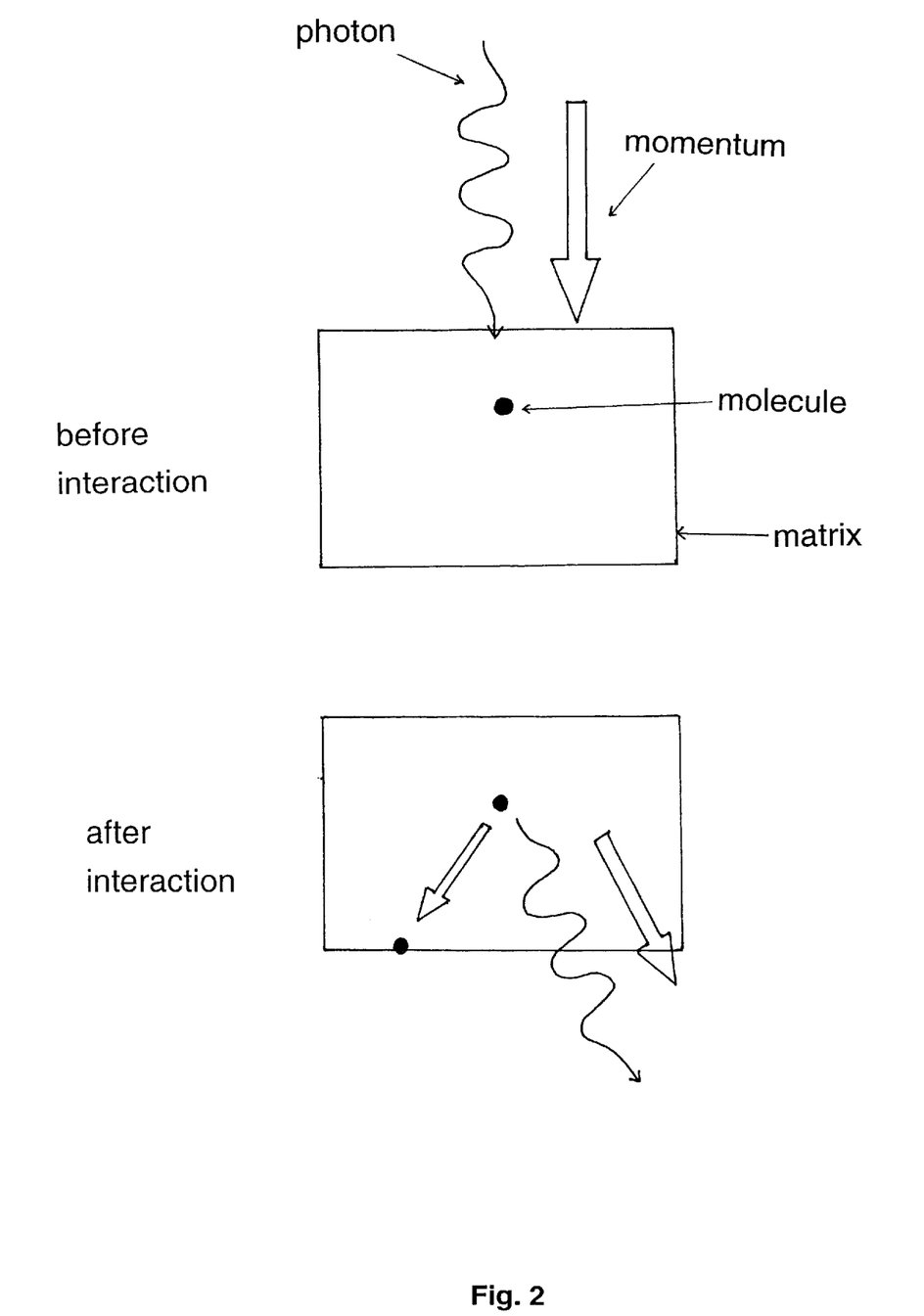
FIG. 2 shows the delivery of photons that are absorbed or reflected off molecules, thereby exchanging momentum with a net force in the direction of the light.
Figure 3:
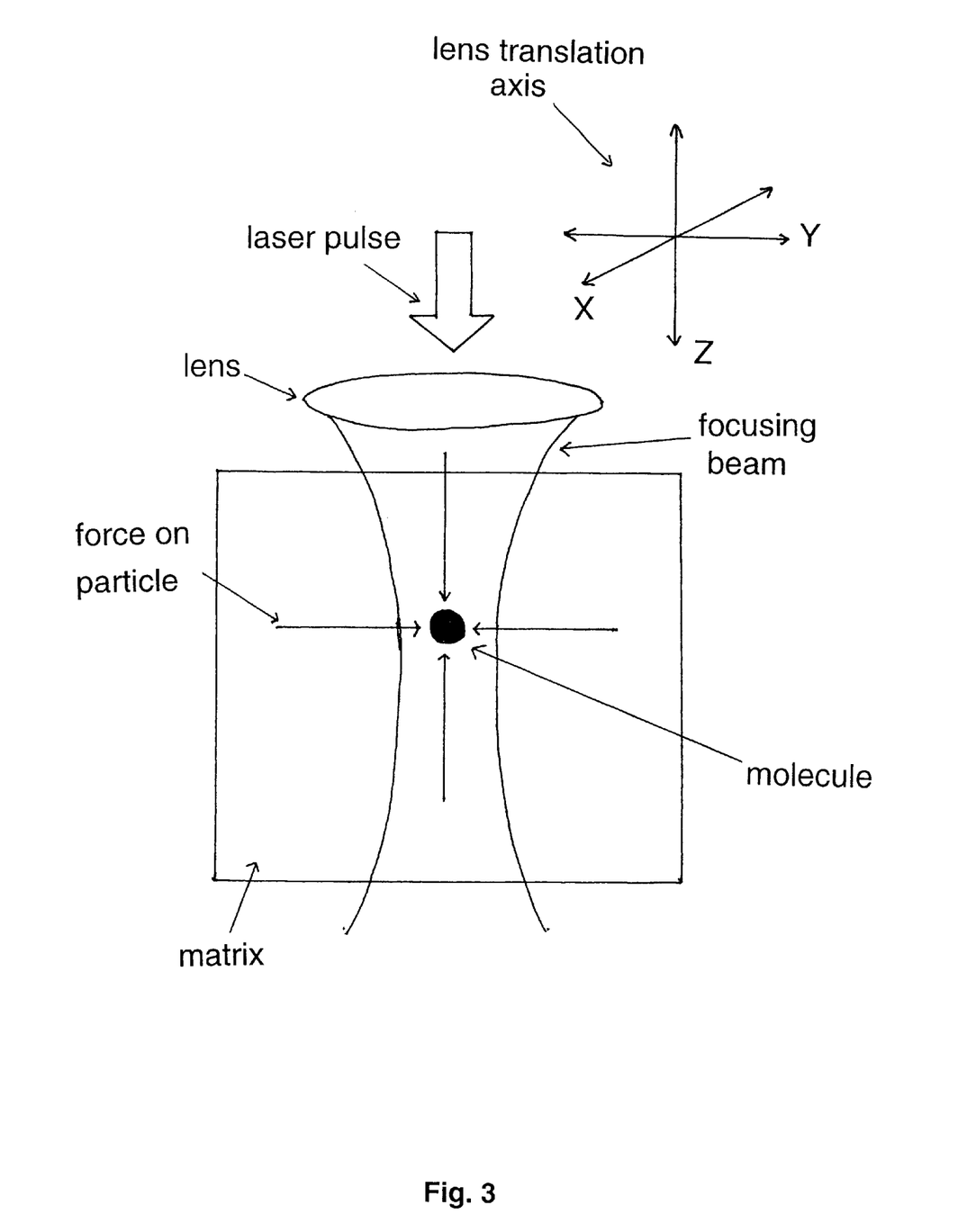
FIG. 3 shows the formation of an optical trap and resultant force on a molecule suspended in a matrix. Movement of the trap results in an additional force that creates a pressure effect, which essentially "pulls" the molecules along a gradient.
Figure 4:
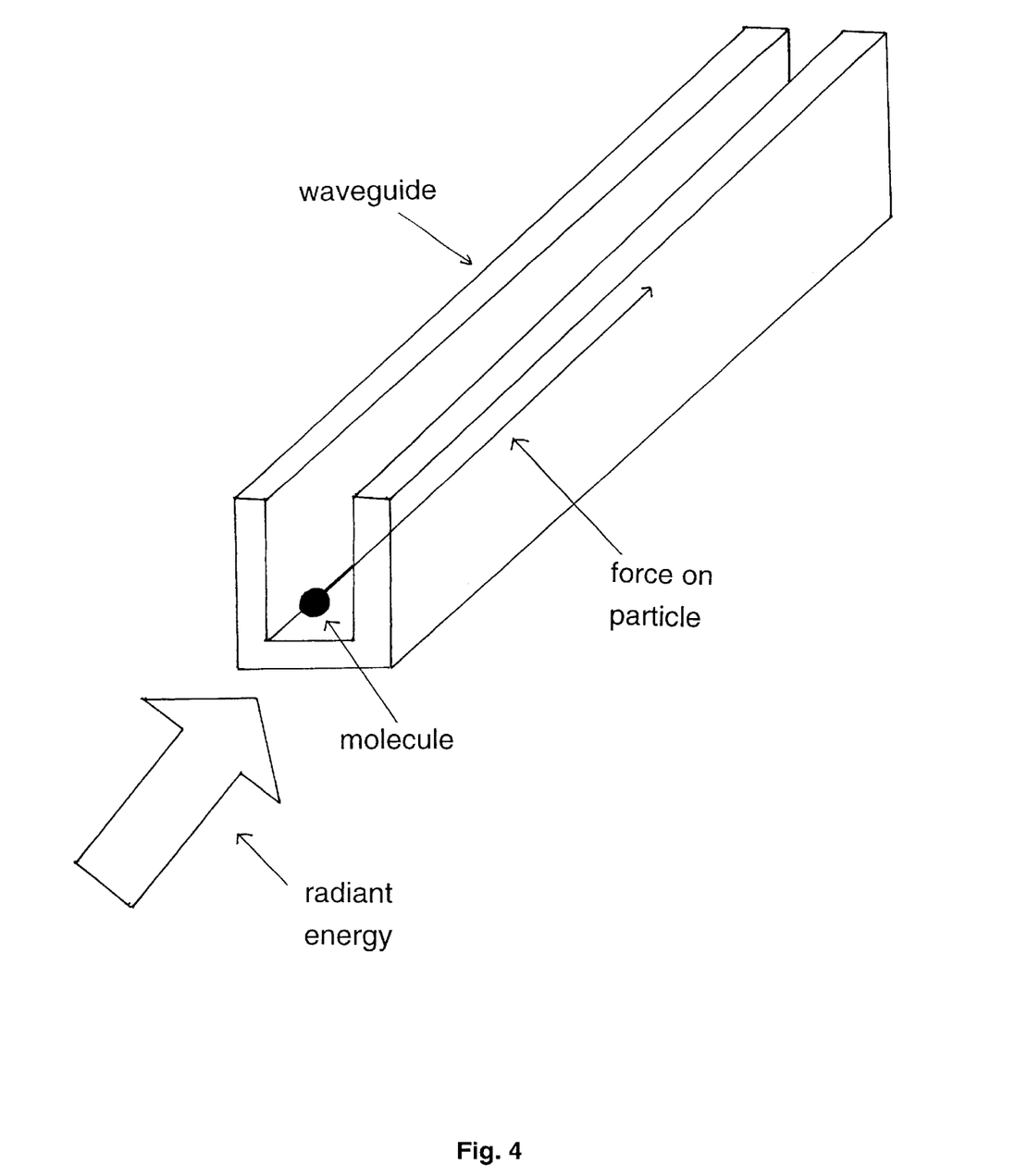
FIG. 4 is a waveguide device for channeling energy that creates a force on particles or fluids in the waveguide.
Figure 5:
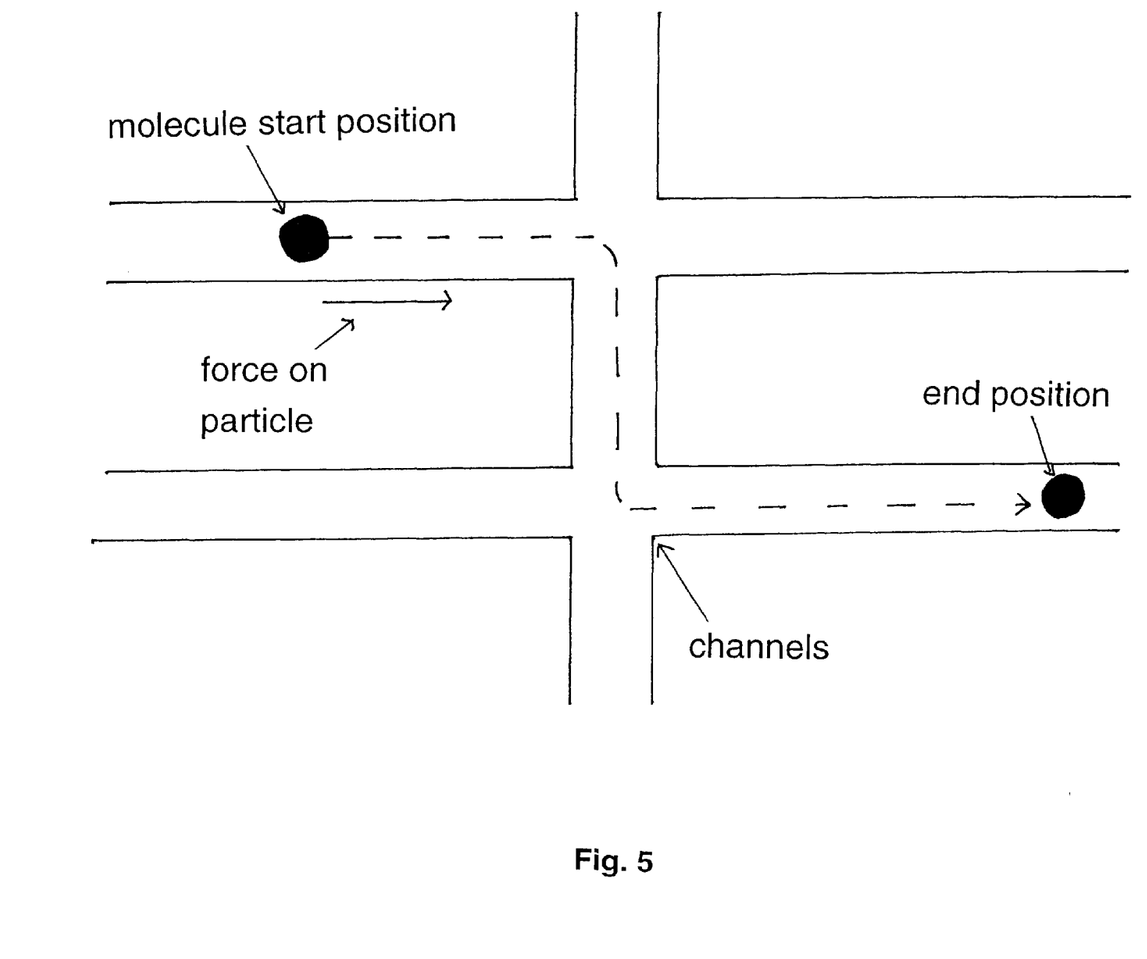
FIG. 5 is a surface with channels showing how a molecule (or fluid) can be manipulated to move (along the dashed line) preferentially in a desired direction, by pressure devices such as optical traps.

The present invention uses non-ionizing radiant energy (for example, the infrared radiant energy produced by an Er:YAG laser) to accelerate the diffusion rate of substances in semi-solid or liquid media or to accelerate the movement of droplets. These methods, referred to as delivery of "optical pressure", "optical pumping", or "optical propulsion", involve the creation of a type of pressure which serves to increase the pressure upon a target. In the method of "optical pressure", propagating pressure waves are used to create pressure in a medium such that the diffusion rate of the substances in the medium, e.g. a biological compound, is increased relative to its surrounding environment (FIG. 1). In a related but distinctly different process of "optical propulsion", the pressure associated with propagating photons can also be applied directly to compounds in order to push these substances through a semi-solid, porous or liquid medium. Optical propulsion relies on the delivery of photons that are absorbed or reflected off molecules, thereby exchanging momentum with a net force in the direction of the light (FIG. 2). Alternatively, an optical trap is formed to create the pressure effect, which essentially "pulls" the molecules along a gradient (FIG. 3). The trapping and propulsion effects may also be used to exert pressure upon droplets, causing them to move, along a surface, in channels (FIGS. 4 and 5) or through micro-bore tubing. The radiant energy is provided by lasers, or other forms of electromagnetic radiation such as radiofrequencies or microwaves.

The present invention typically consists of a continuous wave (CW) or pulsed laser, used alone or in combination, which is capable of generating impulse transients or a focused beam of energy. In the case of impulse transients, a pressure wave is created that moves through a medium, thereby exerting a pressure that varies throughout the medium, having an effect such that particles and molecules in the medium flow at differential rates through the medium.

A number of parameters may be manipulated for a desired effect on different types of solutions or chemical compositions. Some of these include energy fluence, energy fluence rate, pulse length, wavelength of radiant energy, irradiation field size, and pulse repetition rate.

An object of the present inventions is to pump fluids along channels formed in semiconductor substrates in devices such as microchip arrays used for diagnostic testing or for high throughput screening. The channels may be created by conventional means such as chemical etching or lithography. In one embodiment, these channels may be formed physically, as in the form of a trough, or in another, by applying a "reflective" material in a strip along the channel, which guides the electromagnetic energy. This system is used for moving a plurality of samples into a microarray of a plurality of wells connected by one or more channels for the testing or synthesis of samples. Fluid flow is controlled by optical devices or by other types of devices which use electromagnetic energy to create a type of "pressure." Samples may be loaded from a single or multiple loading channel and may be processed independently or in parallel.

The present invention invention allows tiny, precise volumes to be manipulated such that rate of flow, volume, size of droplet and spatial delivery of the sample can all be controlled so as to deliver an accurate volume of fluid to the appropriate chambers on the array.

In one embodiment of the present invention, there is provided a method for separating molecules in a mixture, comprising the steps of applying the mixture to a support; and then irradiating the mixture with electromagnetic energy, wherein the electromagnetic energy creates a pressure wave, a dipole force or an incoherent force in the mixture, which causes the separation. Preferably, the electromagnetic energy is selected from the group consisting of radiofrequency, microwave, and light. Still preferably, the support is a liquid or semi-solid support.

In another embodiment of the present invention, there is provided a method for increasing diffusion rate of a substance in a medium, comprising the step of applying electromagnetic energy to the medium containing the substance, wherein the electromagnetic energy generates propagating pressure wave, dipole force or incoherent force in the medium, thereby increasing diffusion rate of the substance. Preferably, the electromagnetic energy is selected from the group consisting of radiofrequency, microwave, and light. Still preferably, the medium is a liquid or semi-solid medium.

In still another embodiment of the present invention, there is provided a method of moving fluids on a substrate, comprising the steps of applying electromagnetic energy to the fluids, wherein the electromagnetic energy generates a propagating pressure wave, dipole force, or incoherent force at the fluid-substrate interface, thereby moving the fluids on the substrate. Preferably, the substrate is a microchip, a microarray plate or a solid support other than a microchip or microarray plate. Still preferably, the electromagnetic energy is selected from the group consisting of radiofrequency, microwave, and light.

The following examples are given for the purpose of illustrating various embodiments of the invention and are not meant to limit the present invention in any fashion.

EXAMPLE 1
Pressure Wave Optical Pressure

Figure 6:
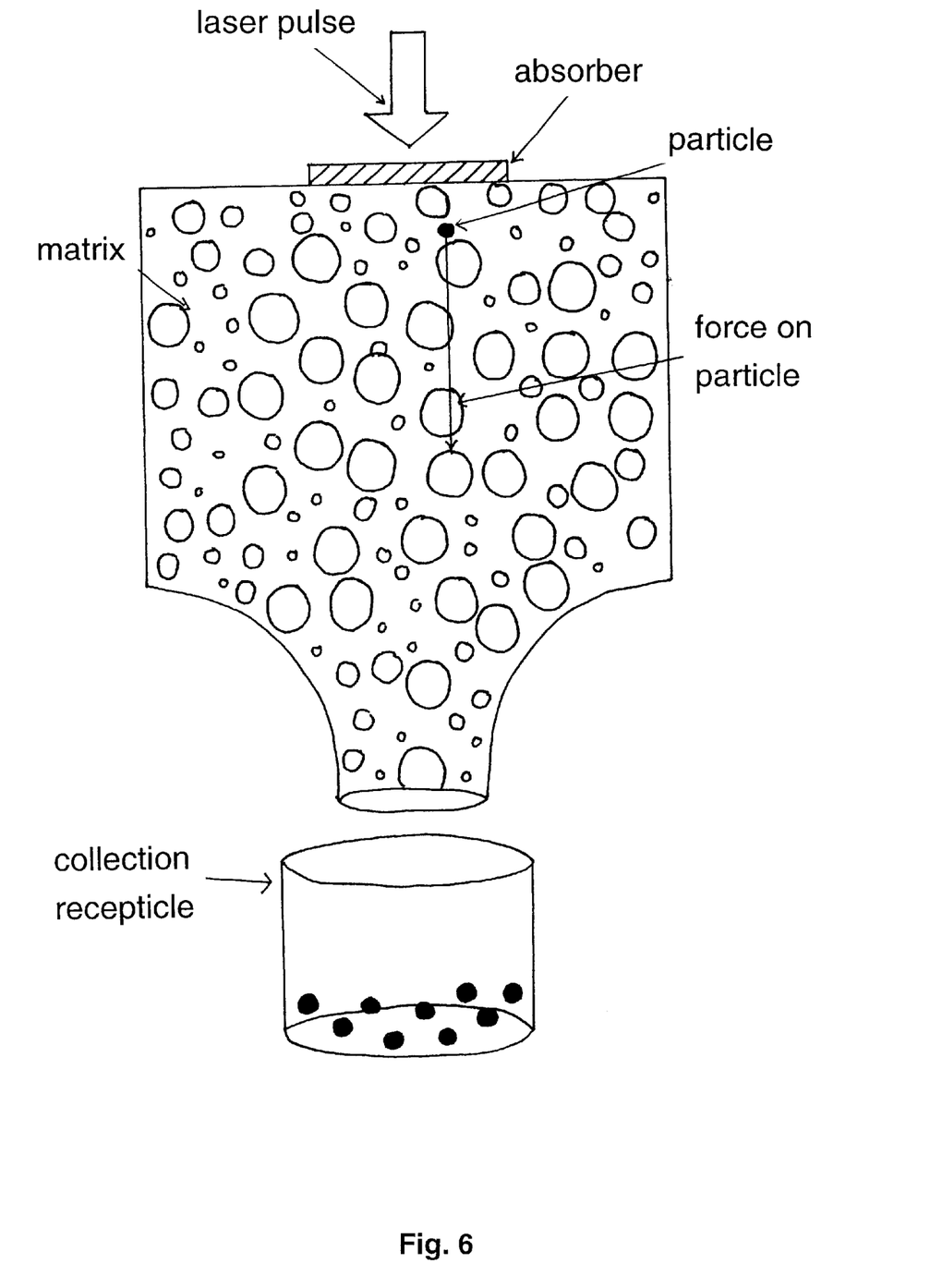
FIG. 6 shows that pressure waves may be applied to a chemical composition in a formulation in contact with, or impregnated in, the separation media in order to drive the substances in the formulation through the medium.

In one aspect of the invention, pressure waves created through the interaction of electromagnetic energy with matter may be used to drive molecules through a semi-solid, porous medium, or liquid such as one found in separation gels including agarose, polyacrylamide and numerous types of cellulose. For example, the interaction of laser irradiation with tissue can lead to the generation of propagating pressure waves (generated from a rapid volumetric change in the medium by heating, or by the generation of plasma) which are in the form of low pressure acoustic waves propagating at the speed of sound or high pressure shock waves propagating at supersonic speeds. These waves can also be a consequence of a generation of waves in a target that is in intimate acoustic contact with the separation media. These pressure waves may be applied to a chemical composition in a formulation in contact with, or impregnated in, the separation media in order to drive the substances in the formulation through the medium (FIG. 6). Continuously pulsing electromagnetic energy delivered in discrete short duration pulses propagates the pressure waves, which thereby creates a pressure that physically forces the substances in the formulation between "pores" in the media. The "pumping" effect may occur through the creation of increased pressure, including osmotic or atmospheric pressure. A separation results, which is due to the differential resistance of the medium relative to the fluid medium, which is the mobile phase.

EXAMPLE 2
Optical Propulsion

The aforementioned "pumping" effect may occur through the creation of increased pressure, including osmotic or static ambient pressure. Part of the importance of this invention is that it can provide a way with which to propel uncharged molecules. In another embodiment of the invention, continuous or pulsatile pressure may be applied directly to particles and molecules themselves in a medium. The particulate or molecular object target would have different absorption or scatter characteristics than the medium such that the absorption or scatter of electromagnetic energy of the target results in an exchange of momentum from the photons to the target such that the target is propelled at a differential rate relative to the medium. Optimally, the wavelength chosen would neither result in a molecular nor electronic rearrangement as these two events would lead to the inefficient use of energy.

Light can exert forces on a molecule because photons carry momentum. The exchange of photon momentum with a molecule can occur incoherently, as in the absorption and readmission of photons, or coherently, as in the redistribution of (or lensing) of the incident field by the molecule.

EXAMPLE 3

Incoherent Force

The incoherent interaction that can alter the momentum of an atom is also called the "scattering force" because it arises from direct scattering events. Every time an atom scatters a photon carrying momentum $p=h/\lambda$ (h is Planck's constant and $\lambda$ is the wavelength of light), the atom experiences a small change in velocity. In the case of incoherent scattering, two momentum impulses are delivered to the atom: one along the direction of the incident photon and another opposite the direction of the scattered photon. Because the photons in rare media are not scattered into a preferred direction, the net average velocity change per scattered photon $\Delta v$ is opposite the direction of the incident photons with $\Delta v=p/M=h/\lambda M$, where M is the mass of the atom. Note that this force therefore also provides a means with which to separate atomic or molecular species based on their mass, M.

The momentum imparted on the molecular target in an inelastic collision is equal to the ratio of the photon energy, U, divided by the speed of light, c. Given a critical amount of energy fluence (rate) in the electromagnetic energy continuous-wave beam or pulse, significant forces can be imparted on the molecular target thereby inducing movement since force is equal to the time derivative of momentum.

This incoherent force could, for example, be used in the following way. The electromagnetic energy produced by a pulsed or continuous-wave Nd:YAG laser (1064 nm wavelength) could be used to irradiate a molecule which does not significantly absorb energy having such wavelength. The molecule, if placed on the a semi-solid support, such as gelatin or agarose, for example, would then scatter the electromagnetic energy in such a way that the net momentum imparted upon the molecule is in a direction away from the surface of the support. Thus, the penetration of the drug into material would be enhanced as compared to passive diffusion.

The incoherent force on a molecule results when the molecule absorbs or scatters radiant energy. Such force is the momentum associated with photons, not a pressure wave pushing the molecules. Incoherent force is the most efficient when absorption takes place, although it's important that the molecule doing the absorbing does not undergo an irreversible change such as photolysis or chemical bond-breakage.

EXAMPLE 4

Coherent Force

The force arising from a coherent interaction with light is also called the dipole force. The laser field polarizes the atom, and the polarized atom experiences a force in the gradient of an electromagnetic field. The strong electric field of a laser beam can be used to induce a dipole moment in a process called optical trapping. As long as the frequency of the laser field is below the natural resonances of the particle being trapped (e.g. below the atomic transition of an atom or the absorption band of a polystyrene sphere), the dipole moment is in phase with the driving electrical field. Because the energy, W, of the induced dipole, p, in the laser field, E, is given by $W=-pE$; the particle achieves a lower energy state by moving into the high-intensity focal spot of the laser beam. There have been numerous reports of optical traps being used to manipulate particles, or even cells. These traps are used to move these tiny particles around under a microscope objective. Optical tweezers have also been described whereby a focal spot of a single beam optical trap is moved with mirrors or lenses. It has also been shown that other forms of electromagnetic energy may be used to form such "traps."

In the present invention, a "trap" is made by creating a non-uniform field of waves (e.g. photons, ultrasound, electric or magnetic). Due to the interaction of the molecule with the non-uniform field, there is a force imparted that tends to pull the molecule towards the most intense part of the field. Such a trap is formed at the tissue interface where a desired molecular target is to be moved in a particular direction. In the case of separations, the direction is into a semi-solid support. Thus, the focal point of the trap is moved along a vector that penetrates the material of interest, while a solution containing the compounds to be separated is applied to the surface of the tissue. In the case of an optical trap, the focal point of a single beam or multiple beam trap would then be moved progressively into the matrix of the support, which could occur cyclically so as to ensure the maximum pumping effect. Besides optical traps, other types of traps, such as magnetic, radiofrequency or microwave traps would also be useful.

The most intense part of the field (typically the focal point of some optic) is moved in a way such that the molecules are dragged into or out of the tissue. This method allows for continuous and controllable transmembrane drug delivery.

Radiofrequency or microwave radiant energy would be most suitable as the physical size of the volume whereby a driving force could be created is much larger than it is when light is used. Optical traps using light are microns in size, while traps using microwaves or RF could be centimeters in size. Furthermore, because microwaves and RF are not scattered in tissue as much as light, the former would be able to maintain their integrity to a greater depth in tissue than light.

EXAMPLE 5

Target Molecules/Compounds

Strategies described within include targeting molecules or molecular groups based on energy absorption characteristics. Absorption typically depends on the functional group present and not the complete molecular structure, or it can be due to single bond stretching and bending vibrations. For example, infrared absorption of biomolecules can be broadly broken down into three regions. An OH group stretching vibration is near 7140 $cm^{-1}$ (1.4 microns) and an NH stretching vibration is near 6667 $cm^{-1}$ (1.5 microns) in the near-infrared or NIR (800 nm-1.5 microns). In the mid-IR, 4000 to 1300 $cm^{-1}$ (2.5–7.7 microns) is the "group frequency region", while 1300 to 650 $cm^{-1}$ (7.7–15.4 microns) is the "fingerprint region". Choosing groups which optimally absorb or reflect radiation would allow one to optimize the motion characteristics of the molecule carrying that group.

Also, adding absorbing groups to molecules may enhance their sensitivity and migration potential. Therefore, another object of this invention is to define a class of compounds which is constructed on the basis of the electromagnetic energy absorption or reflection characteristics. Specific formulations are chosen such that electromagnetic energy absorption or scatter is maximized relative to the surrounding medium. Further, many compounds can be modified by the addition of such energy absorbing or scattering groups so as to maximize optical propulsion of a particular formulation. This invention thus defines a new class of compounds that are optically propelled by virtue of the addition of groups or structures that absorb or scatter light in a characteristic way that imparts momentum to the molecule causing it to move relative to the medium which contains it. These compounds are designed to include both physiologically active groups and molecular groups which maximize the absorbance or scatter of light so as to be propelled relative to its surrounding medium. For example, it is possible to conjugate a photosensitizing compound, called CMA, with an antibody in the region of the antibody whereby the ability of the antibody to bind to the antigen is not inhibited. CMA strongly absorbs radiant energy in the visible region of the electromagnetic spectrum, e.g. 650 nm, and so can be used in conjunction with incident 650 nm radiant energy to propel the antibody.

Any alteration in a molecule, such as dimerization or the addition of a group, will change the absorption and scattering properties of the molecule. An increase in either will increase the efficiency of the dipole trap. For example, addition of magnetic species (ferr-, para- and diamagnetic) will enhance the effect of magnetic fields on the molecule. Alternatively, acoustical properties of molecules can be changed by addition of contrast enhancers such as galactose. The addition of this molecule would enhance the magnitude of the push. When using the coherent force to move molecules, it may be beneficial to alter the molecule by enhancing it's scattering cross section through the conjugation of a molecule to, for example, decrease the wavelength of resonance or decrease the natural lifetime.

Specific compound formulations are selected so that electromagnetic energy absorption is maximized relative to the surrounding medium. Many pharmaceutical or diagnostic compounds can be modified by the addition of energy absorbing groups to maximize the effects of the electromagnetic energy on a particular formulation relative to the surrounding medium. A new class of compounds may be defined by their unique permeability and migration characteristics in the presence of or following a treatment of electromagnetic energy. These molecules possess different characteristics by virtue of the addition of energy absorbing structures. As a result, the molecules are imparted momentum to move relative to the surrounding medium, or are altered due to the excitation of the molecules. For example, rapid heating of a molecule preferentially absorbing energy relative to its environment by radiofrequency or microwave energy could result in cleavage of a heat-sensitive linkage or activation of a specific activity. These compounds are designed to activate molecular groups that maximize the absorbance or reflectance of energy to achieve the desired effect.

Similarly pharmaceutically active compounds may be modified by the addition of groups that readily form a dipole when exposed to appropriate electromagnetic energy, such as laser light, radiofrequencies or microwaves. The addition of such groups thus would result in enhanced ability to use optical trapping methods for the delivery of these types of compounds as described herewith. For example, some dielectrics, such as polystyrene, can be induced to form dipoles in the presence of an electromagnetic field, and when in the form of polystyrene microbeads, can also be conjugated to proteins when they are coated with molecules with an affinity to proteins. An example of this would be avidin coated polystyrene beads which efficiently conjugated to biotinylated linked protein.

In fact, the present invention extends to any compound which may interact with electromagnetic energy in such a way that it is propelled through a medium. Thus, the present invention provides a means by which molecules may be propelled through a medium at differential rates relative to the medium and other molecules in the medium, and a means by which molecules may be separated from one another based on their characteristic interaction with electromagnetic energy.

EXAMPLE 6

Microfluidics

Some of the methods describe herein may also be applied to manipulate liquid droplets. For example, impulse transients may be applied to a fluid on a surface, or in a tube. The pressure wave created by these impulse transients would work on the fluid to move it in a desired direction, generally in the direction of the energy impulse.

Alternatively, a trap may be formed that exerts a pressure at the fluid interface. Trap formation and manipulation of cells has been described. Similar traps can be used to exert pressure at the fluid interface in the same manner that Optical Tweezers trap particles in the waist of a strongly focused (cw) laser beam. The optical trap results from the fact that the objects that are trapped in the focus of the laser beam experience a restoring force if they try to leave the high intensity volume. In this case, the incoming beam is separated into two beams. Each beam can be characterized as a plane wave which follows the laws of optics. Most or all the light is transmitted at the surface of the spherical droplet. If the droplet is placed below the center of the focus the resulting force of the trap will act in the upward direction. If the droplet is placed above the center of the focus, the resulting force of the trap will act in the downward direction. If the droplet is placed to the right of the focus, the resulting force of the trap will force the object move towards the center of the trap.

A "channel" is created using two beams which impinge on the fluid from two angles (e.g. 45 and 135 degrees), these lasers create pressure transients which essentially contain a volume, in effect providing a means for adjusting or controlling channel size. The trap then can be moved along a vector such that fluid motion is achieved and volume displacement may be controlled by increasing or decreasing the intensity of the energy delivered.

An optical trap is formed at the surface of a solid support, such as a silicon wafer, where a desired molecular target is to be moved in a particular direction. In this case, a microfluid channel is created by directing the beam along a vector in the direction of interest. Fluids may be directed along channels which are embedded in the support, or along the surface of a flat surface, whereby a channel is created by the directional vector of the trap. Thus, the focal point of the trap is moved along a vector that channels the fluid in the direction of interest. Solutions may thus be brought in contact with one another to form reactions, as in the case of high throughput screening procedures for drug discovery.

Alternatively, mixtures of reagents may be moved along the surface of a support in microassasy preparations.

In the case of an optical trap, the focal point of a single beam or multiple beam trap would then be moved progressively along the desired channel of the support, which could occur cyclically so as to ensure the maximum pumping effect.

EXAMPLE 7
Pressure Waves for Driving Compounds Through Semi-Solid Supports

Pressure waves created through the interaction of electromagnetic energy with tissue or non-biological matter may be used to drive molecules in a medium across semi-solid interfaces. The interaction of radiofrequency (RF), microwave irradiation or radiant energy with an absorber can lead to the generation of propagating pressure waves, which are generated from a rapid volumetric change in the medium by heating, or by the generation of plasma. Propagating pressure waves are in the form of low pressure acoustic waves propagating at the speed of sound or high pressure shock waves propagating at supersonic speeds. These waves can also be a consequence of a generation of waves in a non-biological target which is in intimate acoustic contact with the biological media. Continuously pulsing electromagnetic energy delivered in discrete short duration pulses propagates the pressure waves which thereby physically move the molecules between spaces in the matrix. The "pumping" effect may occur through the creation of increased pressure, including osmotic or atmospheric pressure. A separation results due to the differential resistance of the matrix relative to the fluid medium. The degree of pumping is related to the shape, duty cycle, and power of the driving energy source.

The interaction of laser electromagnetic energy with a semi-solid or liquid medium can lead to the generation of propagating pressure waves in the form of low pressure waves propagating at the speed of sound or high pressure shock waves propagating at supersonic speeds. To create the former, an example of efficacious irradiation parameters would be a wavelength of 1064 nm, 20 ns pulses with energy of 20 mJ and a spot size of 1 mm. In the case of the latter, the same conditions just described will work, except with a wavelength of 2.94 microns instead of 1064 nm.

Pumping may sometimes be inefficient if the energy is deposited directly on a tissue having a large surface area. To compensate for this inefficiency, a target which preferentially absorbs energy at these frequencies may be placed adjacent to the tissue. In the case of high frequencies, this target could effectively act as an antenna and may optionally be composed of metals or metal containing compounds.

For example, a Q-switched Nd:YAG laser producing radiant energy at 1064 nm is configured to produce 20 ns pulses with energies of 2 to 20 mJ at a pulse repetition rate of 10 to 1000 Hz. The beam is focused to a circular spot with a diameter of 1 mm. A thin piece of black anodized aluminum is placed on the surface of a polyacrylamide gel, and a thin layer of aqueous trypan blue (4%) or other dye positioned between the aluminum and gel surface. The laser is oriented to irradiate the surface of the aluminum support or silicon wafer. The laser is oriented to irradiate the surface of the wafer at an angle of from 15 degrees to 45 degrees. The laser is mounted on a two-dimensional platform with micrometer controlled movement. Irradiaton and concurrent movement allow the droplet, or microdroplets partitioned from the droplet, to migrate along a vector that is created by directional movement of the laser. The irradiation takes place for a period of one or more hours, after which time the aluminum is removed and the trypan blue remaining on the surface was removed with an absorptive towel. The gel is cut in cross section through the center of the two positions where the trypan blue is positioned. Upon transillumination with visible light, the trypan blue can be shown to have diffused further into the gel below the irradation site than where no laser irradiation took place.

A related experiment where the laser is oriented so the focusing lens is at the surface of the trypan blue may be used to demonstrate the result of electromagnetic energy induced pressure resulting from molecular absorption or scatter.

EXAMPLE 8
An Example of Optical Propulsion

Continuous or pulsatile pressure can be applied directly to particles and molecules themselves in a medium using electromagnetic energy. For example, a protein could be conjugated to readily available colored polystyrene microspheres which absorb the electromagnetic energy from an diode-pumped Nd:YAG micro-laser (1064 nm, 1 ns pulses at a repetition rate of 10 kHz, peak power of 25 kW). Momentum is imparted unto the polystyrene sphere by the electromagnetic energy, and so is "pushed" in the direction of the propagation of the electromagnetic energy. By adjusting the focal point along this directional vector (into the medium), pressure can be exerted on the particles such that they migrate through the medium. This principal can be applied to the separation of a mixture of compounds whereby different molecules migrate to a lesser or greater degree based on their unique absorption characteristics.

The optical pumping effect may occur through the creation of increased pressure, including osmotic or atmospheric pressure. To "push" particles or molecules in a medium, the chosen wavelength of radiant energy is not absorbed by the ambient medium. The particulate or molecular object to be propelled would have different absorption characteristics than the medium such that radiant energy would be absorbed on the surface of the object or internally. Optimally, the wavelength chosen would neither result in a quantum mechanical molecular or electronic rearrangement as these two events would lead to the inefficient use of energy. The momentum imparted on the molecular target is equal to the ratio of the photon energy divided by the speed of light. Given a critical amount of energy fluence (rate) in the radiant energy cw beam or pulse, significant forces can be imparted on the molecular target thereby inducing movement.

EXAMPLE 9
Optical Traps

One system consists of a versatile inverted microscope with a set of suitable and highly magnifying objectives and with accurate and smoothly running motorized x-, y- and z-adjustment of the "table"; a pulsed Nd:YAG laser, producing UV light at 355 nm for similar activities; various optical components (e.g. mirrors, lenses, polarizers, polarizing splitting and merging cubes, filters) that will create, among other things, two fully movable optical traps (in the x-, y- and z-directions) within the field of view in the microscope; a system of high precision stepmotors for accurate mirror and lens movements for remote manipulation of the two optical traps; CCD cameras (one with enhanced sensitivity for studies of light sensitive processes, weak fluorescence, etc.); high resolution videos for registration and storage; computers that can handle the information provided by the CCD cameras, keep track of the positions of all stepper motors for control and visualization of the positions of the optical traps, and store and handle all data and tasks.

These microfluidic methods may be applied to fluid delivery in microarray devices which are constructed upon "chips" with or without channels. In the absence of channels, a channeling effect may be achieved by creating pressure at the droplet interface between two beams as described above. Volume adjustments and flow parameters may be adjusted vectorally by moving beams to produce a funneling effect, or by moving a trap such that flow results. In this manner, a controlled volume of fluid may be delivered to a particular site on the chip.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present examples along with the methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A method for separating molecules in a mixture, comprising the steps of:
    applying said mixture to a support; and
    irradiating said mixture with radiofrequency energy, microwave energy or infrared light.

2. The method of claim 1, wherein said support is a liquid or semi-solid support.

3. The method of claim 1, wherein said radiofrequency energy, microwave energy or infrared light creates a pressure wave, a dipole force or an incoherent force.

4. A method for increasing diffusion rate of a substance in a medium, comprising the step of:
    applying radiofrequency energy or microwave energy to said medium containing said substance, wherein said radiofrequency energy or microwave energy generates a propagating pressure wave, a dipole force or an incoherent force in said medium, thereby increasing diffusion rate of said substance.

5. The method of claim 4, wherein said medium is a liquid or semi-solid medium.

6. A method of moving fluids on a substrate, comprising the steps of:
    applying one of radiofrequency energy, microwave energy or infrared light to said fluids, wherein said radiofrequency energy, microwave energy or infrared light generates a propagating pressure wave or an incoherent force at a fluid-substrate interface, thereby moving said fluids on said substrate.

7. The method of claim 6, wherein said substrate is a microchip, a microarray plate or a solid support other than a microchip or microarray plate.

8. A method of moving fluids on a substrate, comprising the steps of:
    applying radiofrequency energy, microwave energy or infrared light to said fluids;
    generating a dipole force thereby creating a trap for said fluids at a fluid-substrate interface; and
    moving said trap along a vector across said substrate at the fluid-substrate interface, said fluids thereby moving in the direction of said vector on said substrate.

9. The method of claim 8, wherein said substrate is a microchip, a microarray plate or a solid support other than a microchip or microarray plate.

* * * * *